Feb. 3, 1931.  N. LACROTTE  1,791,415
SHOCK ABSORBER FOR MOTOR VEHICLES
Filed June 24, 1929  3 Sheets-Sheet 1
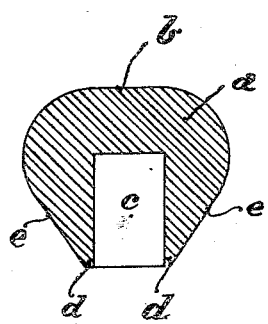
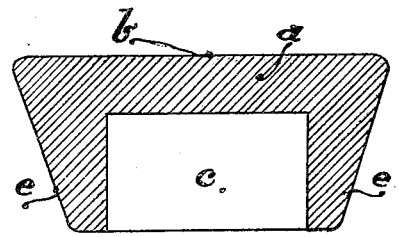
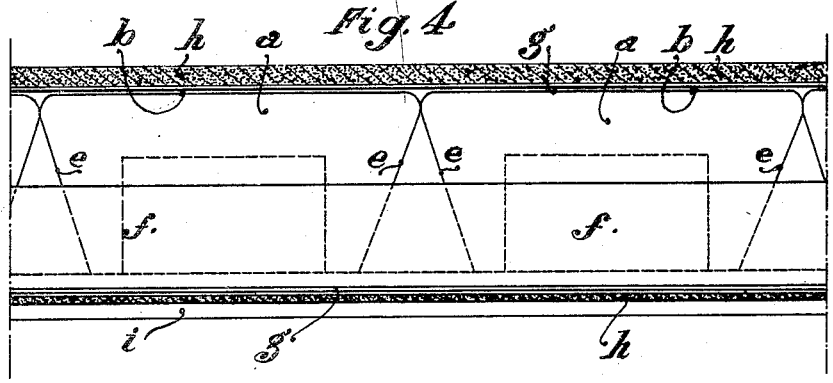
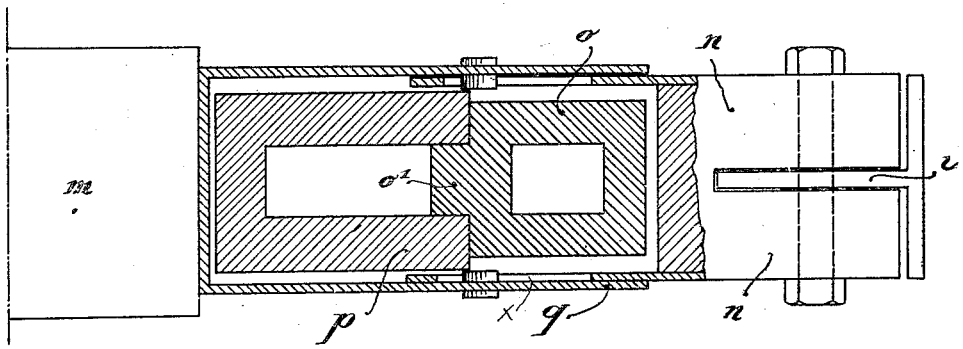

Feb. 3, 1931.        N. LACROTTE        1,791,415
SHOCK ABSORBER FOR MOTOR VEHICLES
Filed June 24, 1929        3 Sheets-Sheet 2
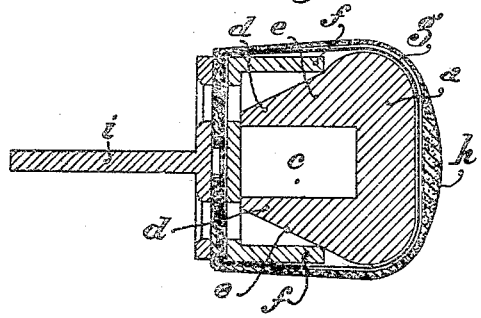
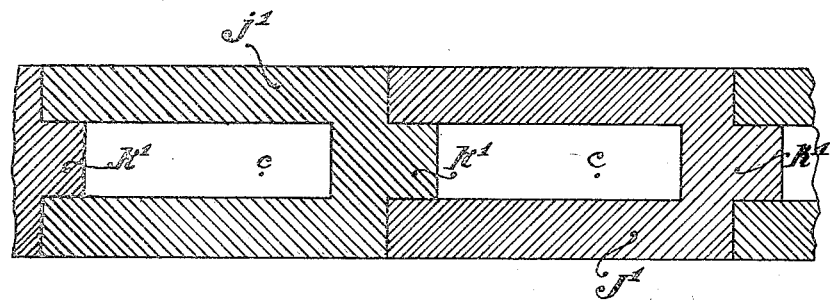
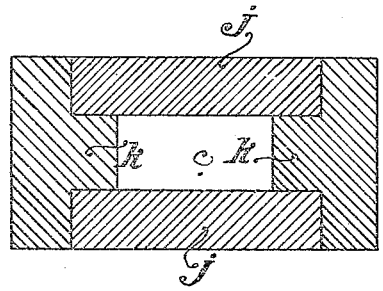

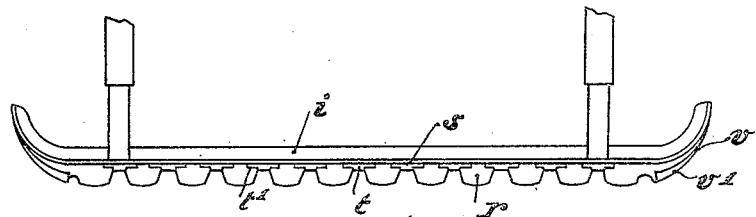
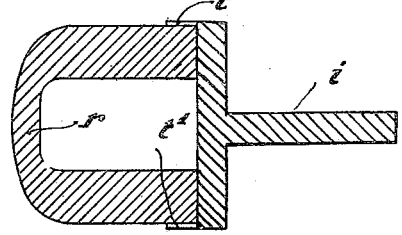
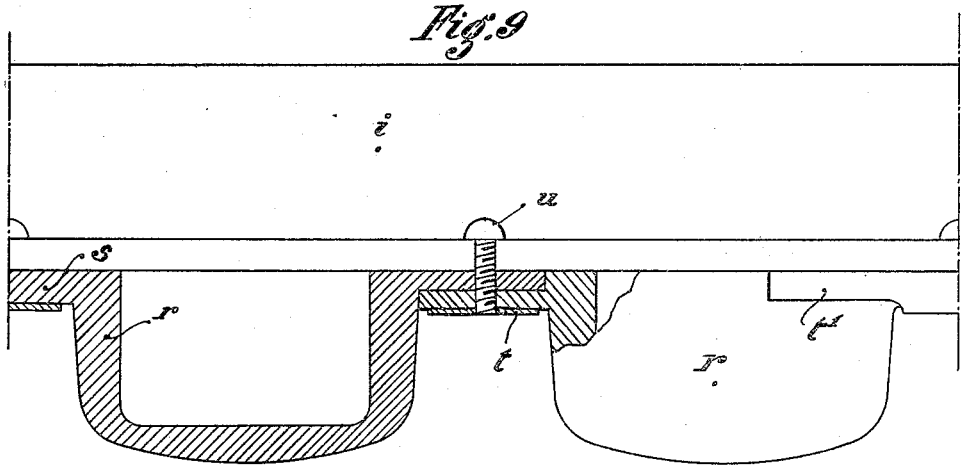
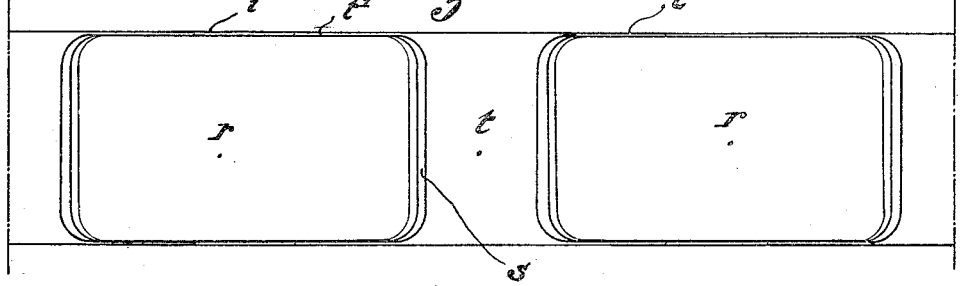

Patented Feb. 3, 1931

1,791,415

UNITED STATES PATENT OFFICE

NAZAIRE LACROTTE, OF PARIS, FRANCE

SHOCK ABSORBER FOR MOTOR VEHICLES

Application filed June 24, 1929, Serial No. 373,311, and in France June 26, 1928.

The object of my invention is to provide an improved system of shock absorber for motor vehicles. My invention consists more particularly in the use of small hollow india rubber pads having a great resistance which are placed upon the front side of the metal bar of the shock absorber in order to receive the shock and to deaden it and in the use of similar pads but having a different shape placed inside the telescoping tubes which usually support the bar of the shock absorber.

The pad support may be of various shapes. It may be for example a channel section iron in the interior of which the pads are placed side by side, said channel iron being secured upon the usual T bar. The pads may also be placed directly upon the sole of the ordinary T bar. In that case they are formed in a continuous piece provided with flat portions between the consecutive pads which are suitably spaced. They are maintained in position in the channel iron by means of a waterproof cover surrounding the branches of the channel iron and secured upon the outer surface of its core or sole.

In the case of a T section bar the flat portions of the continuous part which constitute the pads are retained by means of metal fitting adjusted on the top and secured upon T bar.

The pads or hollow elements may be open on one side or closed on all sides.

The accompanying drawings show by way of example several modes of execution of my invention.

Fig. 1 is a transverse sectional view of a hollow rubber part open on one side.

Fig. 2 is a horizontal section of same.

Fig. 3 is a transverse sectional view of a complete shock absorbing bar.

Fig. 4 is a part sectional view of the shock absorbing bar.

Fig. 5 is a horizontal sectional view of one of the tubular telescoping systems which connect the shock absorbing bar with the longitudinal frame members.

Figs. 6 and 7 represent two modified forms of hollow rubber pads which are closed on all sides.

Fig. 8 is a plan view on a smaller scale of another mode of construction of the whole device.

Fig. 9 is a horizontal sectional part view of a shock absorbing bar.

Fig. 10 is a transverse sectional view.

And Fig. 11 is a part front elevation.

As will be seen in Figs. 1 and 2, the hollow elements of pads $a$ of the shock absorber made according to my invention are of trapezoidal shape in both directions. They are provided with impact surfaces $b$ and an inner cavity $c$ ending outside between thin flanges $d$ designed to contact with the section bar upon which they are secured side by side or at a certain distance from each other.

In the first arrangement shown in Fig. 3 the elements $a$ are placed side by side between the flanges of a channel-section bar $f$, their flanges $d$ being directed towards the inside. It will be seen in said figure that spaces are left transversely between the inclined surfaces $e$ of the pads and the flanges of the channel bar designed to allow the flattening of the elements under the shock. The spaces between two adjacent elements formed lengthwise by the inclined surfaces $e$ (Fig. 4) are provided for the same purpose.

The channel bar, provided along its whole length with elements $a$ is covered over by means of a canvas band or the like $g$ which surrounds the whole and retains the elements in position. A rubber cover $h$ is then placed upon said canvas, its edges being bent backwards and joined together in any suitable manner.

The whole is then secured as usual upon the T section bar by any suitable means, screws or the like.

The hollow elements shown in Figs. 1 and 2 may be replaced by parts having a similar shape or any suitable shape closed on all sides, that is, without any opening to the outside.

Fig. 6 shows an element comprising a tubular rubber part $j$ closed at both ends by means of rubber plugs $k$ which may be or not glued to the tube so as to form an inner chamber $c$.

Fig. 7 shows another modified form in which each element comprises a tubular part $j^1$ open on one side and closed on the other by means of a solid part moulded together with a projection $k^1$ having the same diameter as the opening or inner cavity $c$ of the tube, said projection fitting into the cavity of the adjoining element.

It will be understood that the frame of the shock absorber may be made of bars of various sections, for instance in the case of cylindrical hollow pads, shown in Figs. 6 and 7, the bar may be of semi-circular section and the elements will then be placed side by side and kept in position by means of canvas wrapped around and of a rubber cover.

The shock absorbing bar fitted out in one of the ways above indicated will be advantageously connected to the longitudinal members $m$ of the vehicle frame by means of two sets of telescoping tubes provided with elastic plugs of the kind shown in Fig. 5.

Each set of telescoping tubes comprises a first tube $n$ secured by bolts or in any suitable manner to the back iron $i$ of the shock absorber and containing a shock absorbing india rubber hollow pad $o$ which is supported upon another pad $p$ placed inside a second tube $q$, secured to the longitudinal member $m$ of the vehicle frame. The pad $o$ is provided with a projection $o^1$ engaged in the opening of the second shock absorbing pad $p$. The tube $n$ is provided with guiding slots $x$ to prevent its rotation and consequently allowing it to telescope in the second tube $q$ when the bar receives a shock.

In the mode of execution of the shock absorber shown in Figs. 8 to 11, the set of supporting tubes is identical to that already described.

In this case the elements $r$ are made integral with a moulded india rubber piece provided between the consecutive elements with flat portions which bear upon the bottom of the T section iron $i$. The top of the elements $r$ is rounded in both directions the two longitudinal sides being in parallel and the two transverse sides inclined in such a manner that the longitudinal section is substantially trapezoidal, the large base being engaged upon the iron. The bottom of the T section iron is covered over by two similar elements $r$ which partially overlap each other in the middle and are secured upon the T section iron by means of plated cast iron brackets $t$ which bear upon the flat portions $s$ and are provided on both sides with two projecting tongues $t^1$ which engage the adjacent pads. The brackets are connected to the T section iron by means of screws $u$ having their heads placed advantageously inside, that is, behind the sole of the T. The moulded rubber fittings are secured by means of flat iron bands $v$ provided with flanges $v^1$ which retain the sides of the fittings in position in the same manner as the tongues $t^1$.

What I claim and desire to secure by Letters Patent of the United States is:

1. A shock absorber for motor vehicles which comprises hollow india rubber pads, a metal supporting frame for same upon which the said pads are placed in line, telescoping tubes to connect said supporting frame with the vehicle frame and hollow india rubber pads contained in said tubes designed to prevent their engaging inside each other.

2. A shock absorber for motor vehicles which comprises prismatic rubber pads provided with an inner cavity open on one side of the prism, a frame supporting said pads placed in line upon it in such a manner that the hollow side engages said frame, and elastic means to connect said supporting frame to the vehicle frame.

3. A shock absorber for motor vehicles which comprises rubber pads in the shape of a prismatic hollow cup, a metal supporting frame to carry said pads in such a manner that the hollow side engages the frame, means to secure said pads upon the frame in such a manner as to allow their elastic distortion, and elastic means to connect said supporting frame to the vehicle frame.

4. A shock absorber for motor vehicles which comprises hollow prismatic india rubber pads formed at certain intervals in a moulded rubber piece provided with flat portions between the pads, a metal supporting frame for said rubber piece, means to secure same upon the frame, and elastic means to connect said supporting frame with the vehicle frame.

5. A shock absorber for motor vehicles which comprises hollow prismatic india rubber pads formed at certain intervals in a moulded rubber piece provided with flat portions between the pads, a metal supporting frame for said rubber piece, brackets placed over the flat portions of said piece and secured upon the frame, said brackets being provided with tongues designed to engage the long sides of the adjoining pads, and elastic means to connect the supporting frame to the vehicle frame.

6. A shock absorber for motor vehicles which comprises hollow prismatic india rubber pads formed at certain intervals in a moulded rubber piece provided with flat portions between the pads, a metal supporting frame for said rubber piece, brackets placed over the flat portions of said piece and secured upon the frame, said brackets being provided with tongues designed to engage the long sides of the adjoining pads, telescoping tubes to connect said supporting frame to the vehicle frame and hollow india rubber pads contained in said tubes in order to prevent their penetrating inside each other.

In testimony that I claim the foregoing as my invention, I have signed my name.

NAZAIRE LACROTTE.